United States Patent
Inoue

[19]

[11] Patent Number: 6,078,684
[45] Date of Patent: *Jun. 20, 2000

[54] COLOR IMAGE SCANNING DEVICE

[75] Inventor: Shinji Inoue, Kyoto, Japan

[73] Assignee: Murata Kikai Kabushiki Kaisha, Kyoto, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/960,254

[22] Filed: Oct. 29, 1997

[30] Foreign Application Priority Data

Oct. 31, 1996 [JP] Japan .................................. 8-290067

[51] Int. Cl.[7] .............................. G06K 9/00; H04N 1/46; G06F 3/08
[52] U.S. Cl. .......................... 382/162; 358/518; 358/519; 358/521; 358/530
[58] Field of Search .................................... 358/500, 518, 358/522, 523, 524, 519, 530, 505; 382/162, 167

[56] References Cited

U.S. PATENT DOCUMENTS

| | | | |
|---|---|---|---|
| 4,608,595 | 8/1986 | Nakayama | 358/29 |
| 4,918,538 | 4/1990 | Saito | 358/335 |
| 4,945,405 | 7/1990 | Hirota | 358/75 |
| 5,057,914 | 10/1991 | Tsuji et al. | 358/78 |
| 5,281,981 | 1/1994 | Kajita | 346/157 |
| 5,550,653 | 8/1996 | TeWinkle et al. | 358/514 |
| 5,717,839 | 2/1998 | Ichikawa | 395/109 |
| 5,914,486 | 6/1999 | Yamamoto | 250/226 |

FOREIGN PATENT DOCUMENTS 0 613 291 A1  8/1994  European Pat. Off. .

OTHER PUBLICATIONS

European Search Report for European Application No. EP 97 11 8959, dated May 21, 1999.

*Primary Examiner*—Jerome Grant, II
*Attorney, Agent, or Firm*—Armstrong, Westerman, Hattori, McLeland & Naughton

[57] ABSTRACT

A color image scanning device including an optical color sensor that scans the same image three times for each of the primary colors (RGB) of light, and a sole image processing circuit that receives the scanned image data from the color sensor and corrects it when the color sensor performs scanning of the image. Correction data are stored in a plurality of bank memories of a single memory unit. The image processing circuit obtains desired correction data from the bank memories by a bank exchanging technique.

1 Claim, 6 Drawing Sheets

SE : SATURATED EXPOSURE
V$_{MDK}$ : OUTPUT VOLTAGE WHEN DARK
V$_{SAT}$ : OUTPUT VOLTAGE WHEN SATURATED

COLOR IMAGE SCANNING DEVICE

BACKGROUND OF THE INVENTION

1. Field of the Invention

The present invention relates to an improvement in a color image scanning device used on a color facsimile device.

2. Description of the Related Art

Recently, facsimile devices or copiers which are able to scan color images have been developed and the demand for these is increasing in association with the widespread use of high performance color printers and color displays.

These types of color image scanning devices scan the image for three primary colors of a light (RGB: Red, Green and Blue), respectively, by an optical color sensor including three line sensors, corrects the scanned image data using three image processing circuits (one image processing circuit is provided for each primary color image data) and forms an ultimate color image by mixing these image data.

Because it is necessary to arrange the three image processing circuits on a conventional color image scanning device for corrections of the image data of the three primary colors (RGB) scanned by the color sensor, respectively, the production costs of the device are increased.

SUMMARY OF THE INVENTION

It is an object of the present invention to propose a color image scanning device that is able to reduce the production costs. Production cost reduction is atteined by reducing the number of the image processing circuits. In the present invention, the production cost is reduced by arranging only a single image processing circuit, with the data for correction used in the single image processing circuit being sequentially changed or switched when a series of RGB image data is obtained by scanning.

In order to achieve the above object, a first aspect of the present invention provides a color image scanning device including an optical color sensor that scans the same image three times for each primary color, and a single image processing circuit that receives the scanned image data from the optical color sensor and corrects it whenever the optical color sensor scans the image.

The color image scanning device of the present invention may be utilized on a color facsimile device, color copier, image scanner or the like. The color image scanning device may include a CCD color sensor which scans the same image three times for the three primary colors (RGB) line-by-line or page-by-page. Then, the color image scanning device sequentially corrects each GRB image data by the single image processing circuit.

The image processing circuit may include a memory means that memorizes data for each of AGC correction, shading correction and gamma correction for each of the three primary colors and performs each type of correction on the image data scanned by the color sensor by referring to this memory means.

In order to maintain the exchange of signals at high speed and to prevent the processing from becoming complicated, the memory means preferably comprises individual SRAMs (Static RAMs) or the like for each correction processing and these SRAMs are preferably connected with the single image processing circuit by individual buses. In this arrangement, each of the SRAMs may store data for each type of correction. Each SRAM may have three banks for three primary color image data respectively. The color sensor scans each single line three times to acquire three (RGB) image data. The image processing circuit refers to the memory means to obtain desired data for each type of correction by a bank exchange technique upon scanning of each GRB image data. The color sensor scans the image on one line for each of RGB (i.e., it scans one line three times) by the line sequential method. Nine banks may be arranged as expansion memories corresponding to RGB for each correction processing (three banks may be arranged in each SRAM and three SRAMs may be arranged for three types of correction, i.e., gamma correction, AGC correction and shading correction, respectively). These banks are referred to respectively (or sequentially) during scanning when the correction processing of the image data for the respective RGB is performed.

BRIEF DESCRIPTION OF THE ACCOMPANYING DRAWINGS

Figure 2:
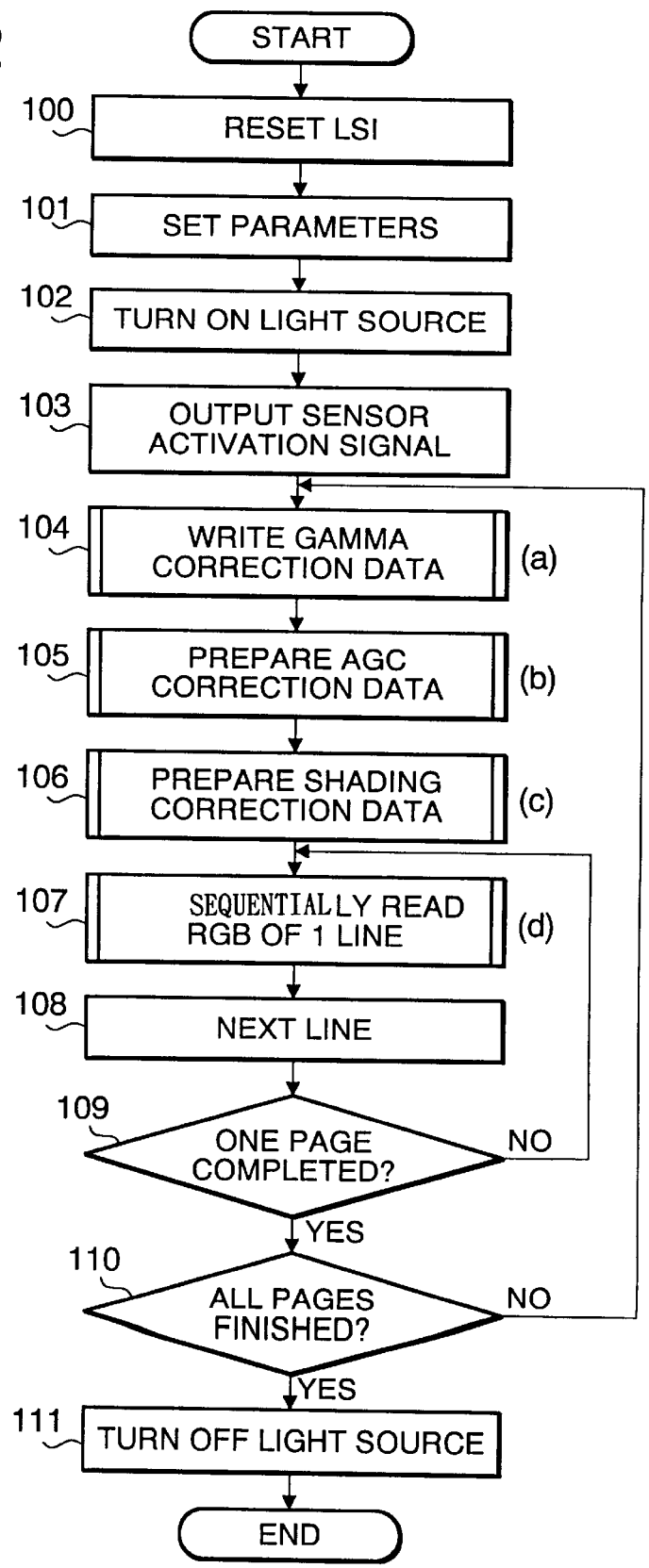
FIG. 2 shows a flow chart of the basic operations of the color image scanning device shown in FIG. 1.

FIGS. 3(a) to 3(d) are subroutine flow charts showing details of particular operations executed in the flowchart of FIG. 2, respectively.

Figure 4A:
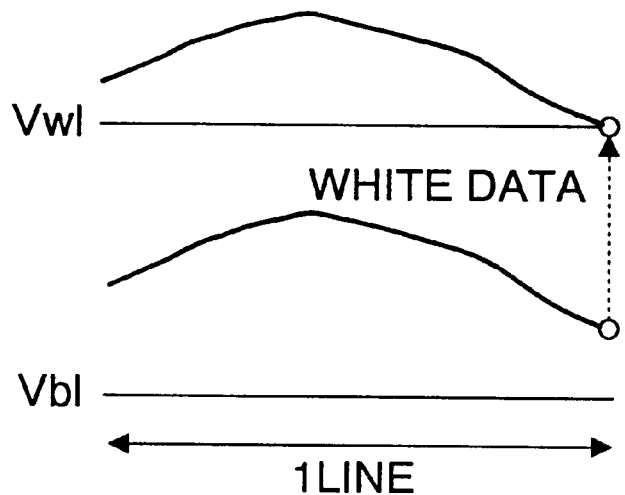
Figure 4B:
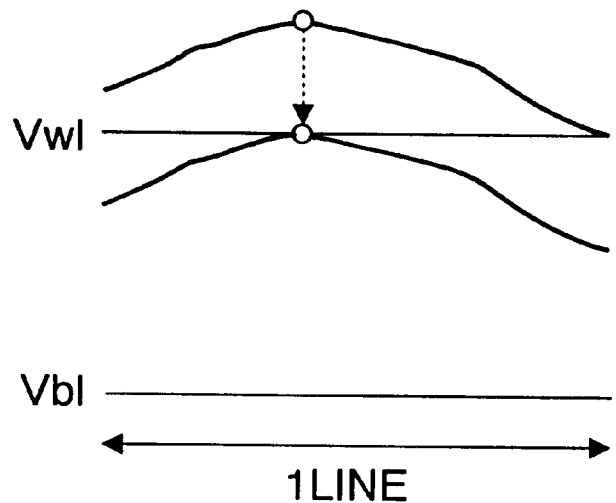

FIGS. 4(a) and 4(b) illustrate AGC correction respectively.

Figure 5:
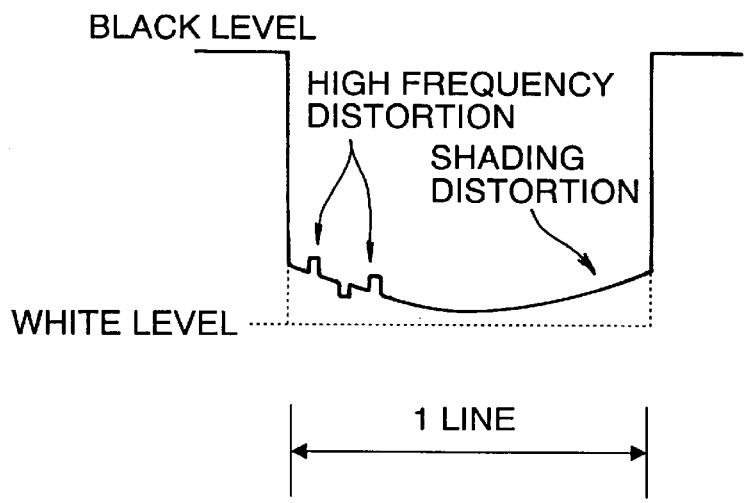

FIG. 5 illustrates shading correction.

Figure 6:
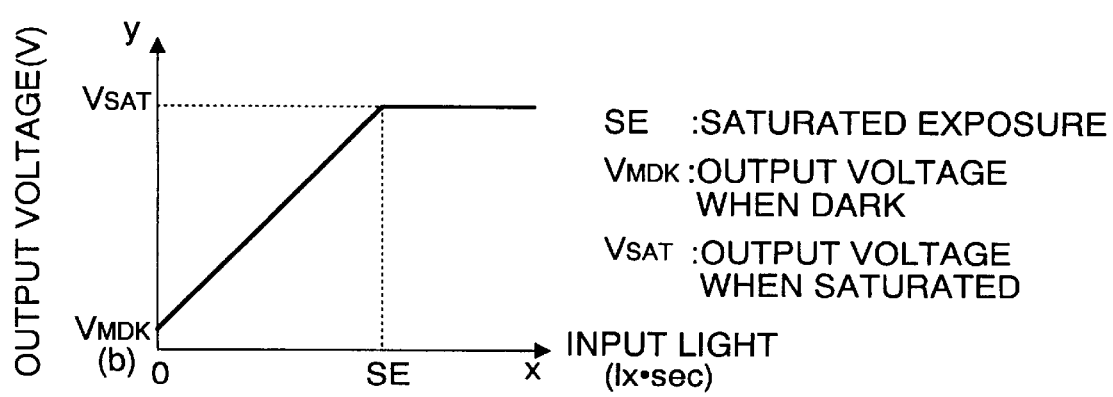

FIG. 6 is a drawing useful to describe gamma correction.

DETAILED DESCRIPTION OF THE PREFERRED EMBODIMENTS

Hereafter, a preferred embodiment of the present invention will be described together with the accompanying drawings.

At first, however, general techniques for image data correction performed by an image processing circuit will be described with reference to FIGS. 4(a) to 6 of the accompanying drawings.

FIGS. 4(a) and 4(b) illustrate the AGC (Automatic Gain Control) correction. The output level of an analog signal of the image data scanned by a color sensor usually differs due to the characteristics of the particular color sensor employed and the type of a light source employed to illuminate the image. However, an A/D converter that changes these analog signals to digital signals fixes reference voltages (white level voltage and black level voltage). Thus, before entering the analog signals into the A/D converter, the peak value of the analog signal should be detected and the detected peak value should be corrected to conform with the full scale value of the A/D converter.

For explanation of one example of these procedures, the white data is first scanned and then the output level of the final pixel of one line is aligned with the white level voltage (Vwl) by increasing the gain (the gain is raised in FIG. 4(a) as indicated by the broken-line arrow). Next, the peak value of the output is aligned to the white level voltage (Vwl) by controlling the gain (the gain is lowered in FIG. 4(b) as indicated by the broken-line arrow). In each of FIGS. 4(a) and (b), "Vbl" indicates a reference white level.

FIG. 5 is a drawing illustrating shading correction (nonuniform correction).

As shown in the drawing, shading distortion and high frequency distortion are generated in the output wave form of the white data in the main scanning direction when scanned by the color sensor. The shading distortion is caused by decrease in the volume of light at both sides of the light source and less light around the periphery of a lens provided to pass a light reflected from the image. The light focused upon passing through the lens enters the optical sensor. The high frequency distortion is caused by characteristic scattering of the sensor pixel units. Thus, correction of these distortions is necessary. By correcting these distortions, the sensitivity irregularity of the sensor and the illumination irregularity are overcome and the concentration values of the image data appear uniform. The corrected image data is indicated by the flat horizontal broken line below the before-correction solid line in FIG. 5.

Referring to FIG. 6, illustrated is a general feature of the photo-electrical conversion which is demonstrated by an optical sensor. The relationship between the incoming amount of light and output voltage is expressed by the following equation.

$$y = ax^\gamma + b$$

y: Output voltage a: Sensor sensitivity x: Incoming amount of light b: Output voltage when dark The gamma correction adjusts the gamma ($\gamma$) of the above equation. Specifically, in order to make the image data as close as possible to the natural image, the gamma correction corrects the value of gamma in the above equation (the gamma characteristics of the sensor) to the sensitivity characteristics (logarithmic characteristics) of the human eye (in FIG. 6, gamma=1). According to the gamma correction, the concentration differences are increased with respect to the dark images and the concentration differences are not applied much with respect to the light images. In FIG. 6, the suffix "MDK" of "$V_{MDK}$" represents "Max Dark" and indicates the darkest output value among the CCD output signals.

Now, the embodiment of the present invention will be described.

Figure 1:
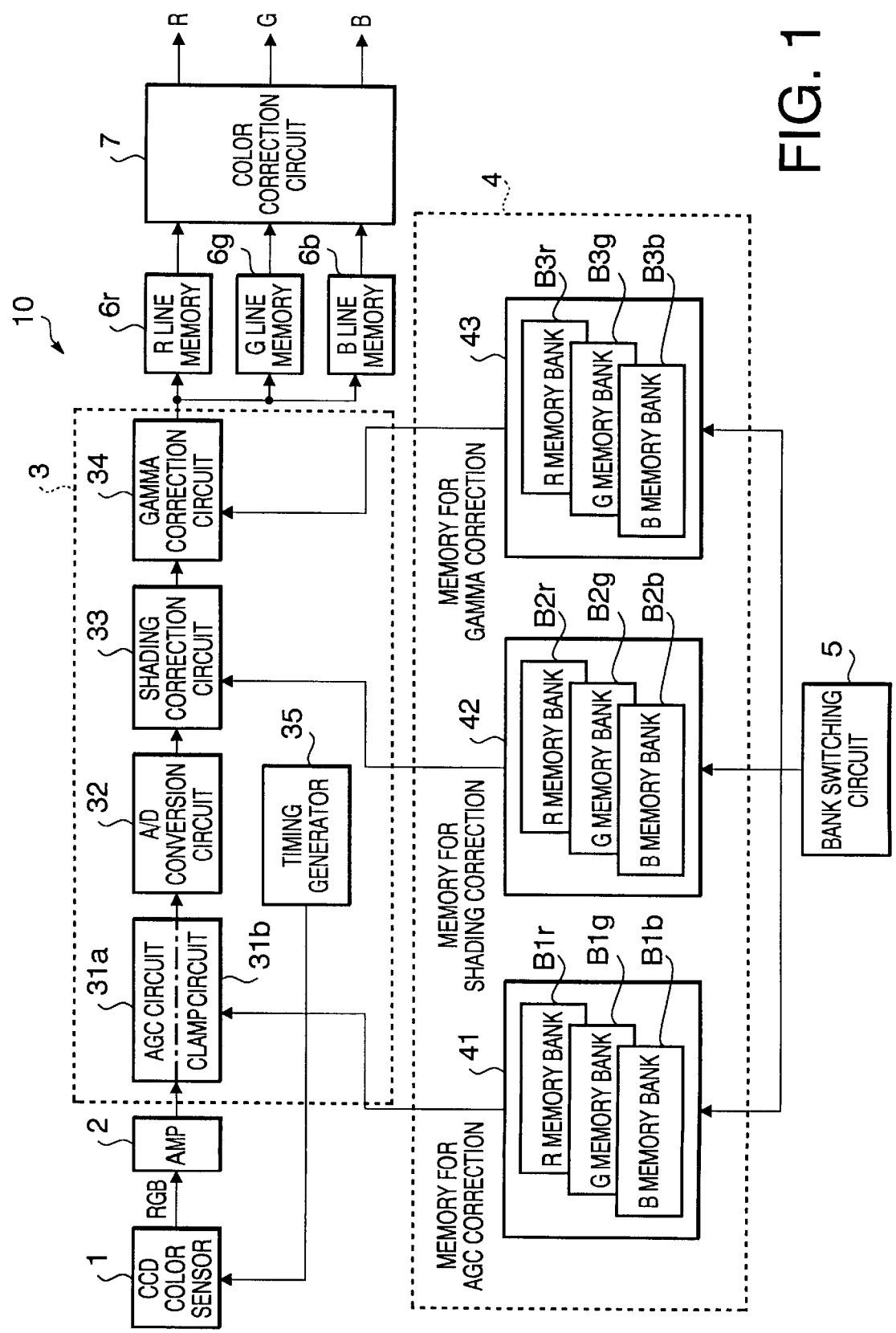
FIG. 1 illustrates a block diagram showing a main part of the color image scanning device of the present invention.

FIG. 1 is a block diagram showing a major portion of a color image scanning device 10 according to the present invention. In this particular embodiment, the color image scanning device 10 is designed to operate on a line sequential method that scans the image for each of three primary colors (RGB) for each line, but the present invention is not limited to this. For instance, the present invention may be applied to a device which operates on a page sequential method that changes the RGB scanning for each page.

In FIG. 1, a reference numeral 1 designates an optical CCD color sensor that scans the same image three times for the three primary colors (RGB) for each one scanning line, 2 designates an amplifier that amplifies an input analog signal, 3 designates a sole image processing circuit that corrects the scanned image data whenever the CCD color sensor 1 scans the image, 4 designates a memory unit (memory means) that stores correction data used by the image processing circuit 3 for correction of the image data scanned by the CCD color sensor 1, 5 designates a bank exchange circuit, 6r, 6g and 6b designate line memories that store the image data for each of RGB after correction performed by the image processing circuit 3 respectively, and 7 designates a color correction circuit that adjusts intensity (darkness/lightness) of the color based on the image data input from each line memory 6r, 6g and 6b and outputs the adjusted color.

The image processing circuit 3 is provided with an AGC circuit 31a that changes the level of an input wave form and a clamp circuit 31b that sets the black level of the sensor to a reference voltage. These circuits 31a and 31b are provided for AGC correction. The image processing circuit 3 also includes an A/D converter circuit (A/D converter) 32 that converts an analog signal into a digital signal, a shading correction circuit 33 that performs shading correction, a gamma correction circuit 34 that performs gamma correction and a timing generator 35 that controls the scanning of each GRB color image by the CCD color sensor 1.

Furthermore, the memory unit 4 is comprised of three external memories 41 to 43, i.e., an AGC correction memory 41, a shading correction memory 42 and a gamma correction memory 43. Each of the correction memories 41 to 43 includes three banks, i.e., the banks B1r, B1g and B1b in the AGC correction memory 41, the banks B2r, B2g, B2b in the shading correction memory 42, and the banks B3r, B3g and B3b in the gamma correction memory 43. Therefore, correction data for the three primary color image data (R image data, G image data and R image data) for the three types of correction (AGC correction, shading correction and gamma correction) are stored in the nine banks separately or individually.

Each correction circuit 31, 33 and 34 is allowed to refer to the associated correction memory 41, 42 and 43 under the control (sequential changing) by the bank switching circuit 5, and each correction circuit performs the processing based on the correction data acquired.

Specifically, when the CCD color sensor 1 is controlled by the timing generator 35 so as to perform scanning of R (red), the bank switching (or selecting) circuit 5 allows the correction circuits 31, 33 and 24 to access the R memory banks B1r, B2r and B3r in the three correction memories 41. 42 and 43 respectively, when controlled to scan G (green), the G memory banks B1g, B2g and B3g are selected and when instructed to scan B (blue), the B memory banks B1b, B2b and B3b are allowed to feed their correction data to the associated correction circuits 31, 33 and 34, respectively.

Since an appropriate bank is sequentially selected by this bank exchanging, each correction circuit 31, 33 and 34 of the image processing circuit 3 can refer to the same memory (same address) to acquire desired data for correction of each of RGB image data. In other words, the repetitive rewriting of correction data in each correction memory 41, 42 and 43 (or feeding new correction data every time one correction is finished) is unnecessary. Thus, high speed processing is realized.

Hereafter, the basic operations of the color image scanning device 10 will be described with reference to FIG. 2 through FIG. 3(d).

FIG. 2 is a flow chart showing the overall operations of the color image scanning device 10 and FIG. 3(a) to 3(d) illustrate flow charts for particular operations in FIG. 2 respectively.

The image scanning operations start with storing of the correction data in each memory bank B1r, B1g, B1b, B2r, B2g, B2b, B3r, B3g and B3b. After storage of the correction data, scanning of each line will start. In the illustrated embodiment, renewal of correction data is performed for each page (Steps 100 to 111 in FIG. 2) but the present invention is not limited to this. For instance, correction data renewal may not be performed at all.

Figure 3A:
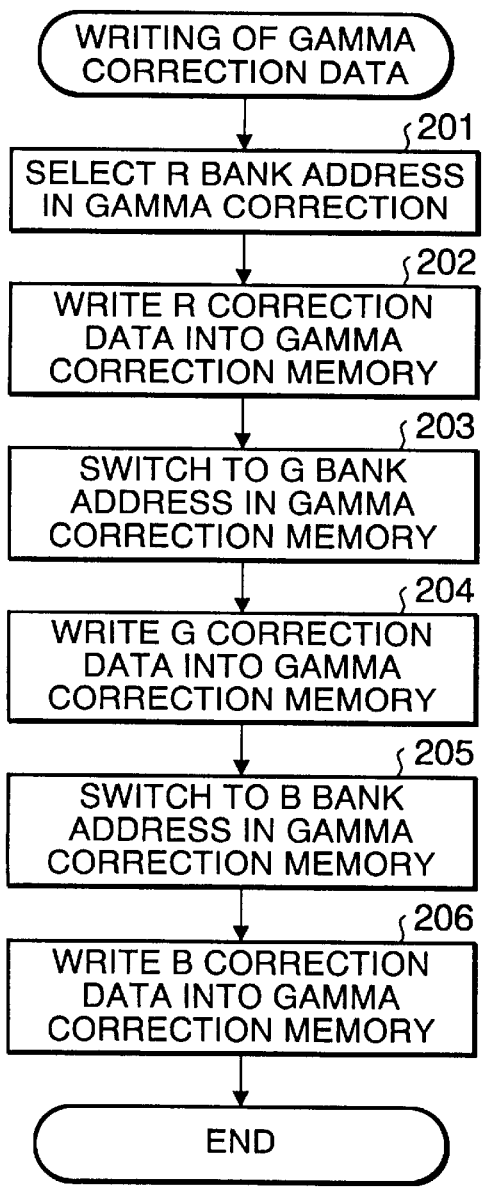

Referring to FIG. 3(a), the gamma correction data write processing (Step 104 of FIG. 2) is illustrated in detail. The correction data to the predetermined gamma value is written and memorized in each memory B3r, B3g and B3b for each of RGB image data while selectively designating a particular address of the gamma correction memory 43 (i.e., address of the memory bank B3r, B3g or B3b) by bank exchanging (or bank switching) (Steps 201–206).

Figure 3B:
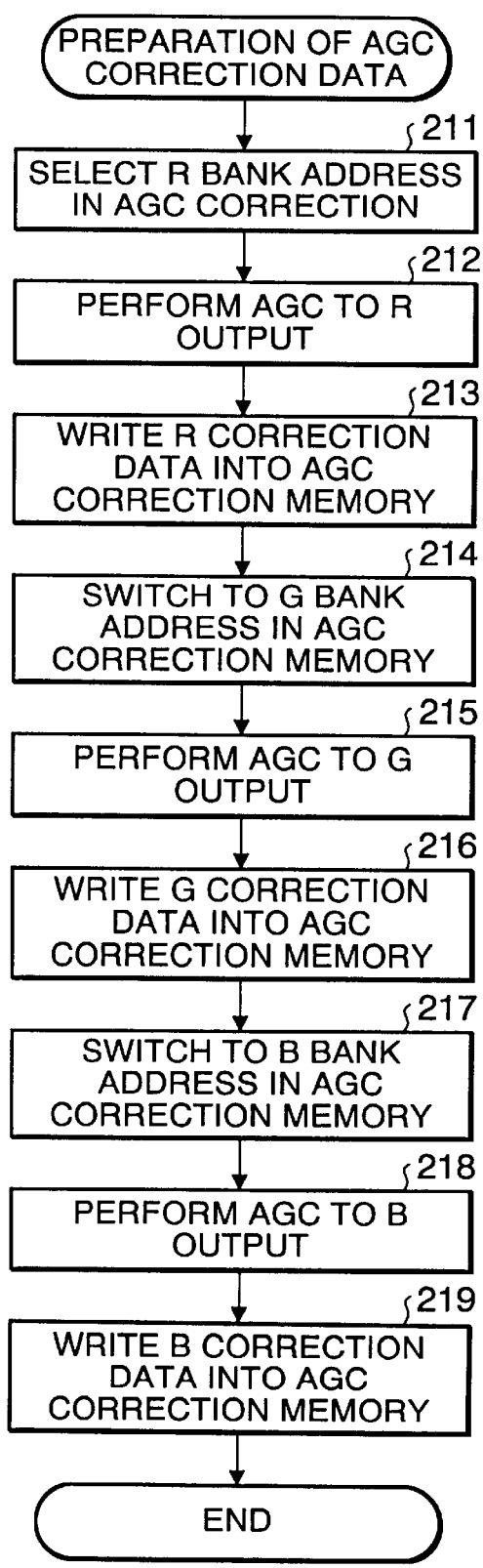

Referring to FIG. 3(b), the AGC correction data production processing (Step 105 of FIG. 2) is depicted. AGC operation (FIG. 4) is performed to each of RGB image data and the correction data such as the controlled gain value or the like is written and memorized in each memory bank B1r, B1g and B1b for each of RGB image data while sequentially designating a particular address of the AGC correction memory 41 (i.e., address of memory bank B1r, B1g or B1b) by a bank exchanging technique (Steps 211–219).

Figure 3C:
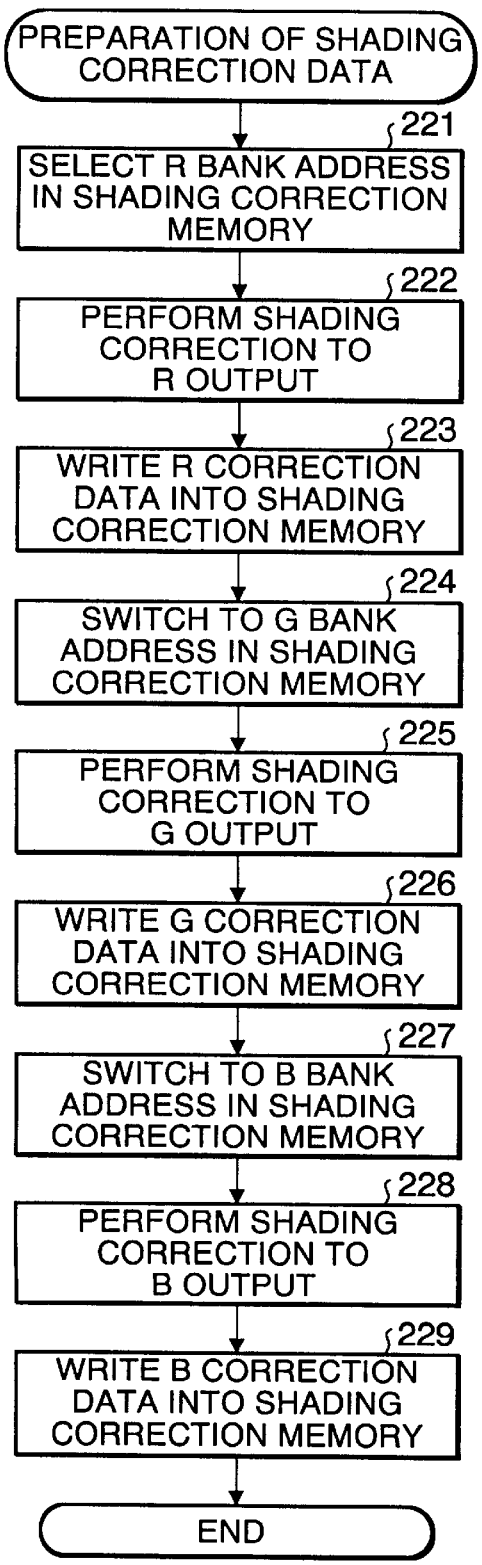

FIG. 3(c) illustrates the details of the shading correction data production processing (Step 106 of FIG. 2). The shading correction (FIG. 5) is performed to each of RGB image data and the correction data regarding the position of the pixel where distortion is generated, the ideal waveform and the like are written and memorized in each memory bank B2r, B2g and B2b for the image data of each of RGB while sequentially designating the appropriate address of the shading correction memory 42 (i.e., address of each of the memory banks B2r, B2g and B2b) by bank exchanging (Steps 221–229).

Figure 3D:
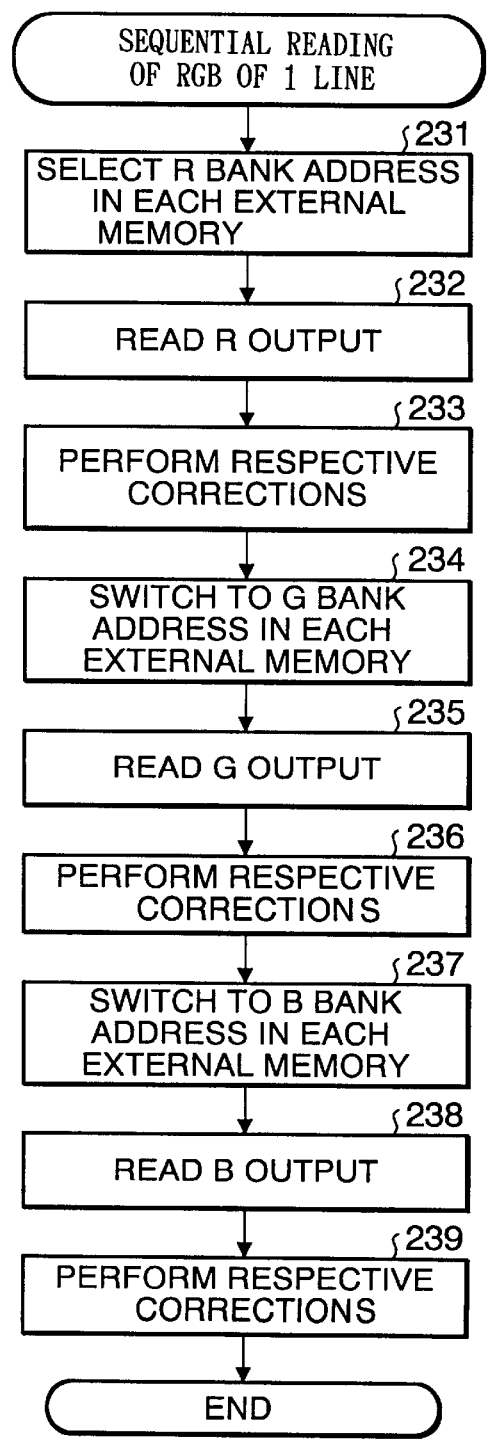

Referring to FIG. 3(d), illustrated is the one line scanning processing (Step 107 of FIG. 2). Each correction circuit 31, 33 and 34 corrects the output of each of the scanned RGB data by sequentially referring to the associated correction memory 41, 42 and 43 while selecting in a predetermined order one address of each correction memory 41, 42 and 43 (i.e., the address of the R memory bank B1r, B2r or B2r, or the address of G memory bank B1g, B2g or B3g, or the address of B memory bank B1b, B2b or B3b) by bank exchanging. The post-correction image data are fed into the line memories 6r, 6g and 6b (FIG. 1) respectively (Steps 231–239).

Then, adjustment of darkness/brightness of the color is performed by the color correction circuit 7 (FIG. 1) based on each of RGB image data.

After that, if this color image scanning device 10 is a facsimile device, the procedures may go to facsimile transmission processing. If it is a color copier, the procedures may go to print-out processing on recording paper.

From the above description, the color image scanning device of the present invention demonstrates the following advantages.

Because the color image scanning device 10 of the present invention corrects the scanned image data by the image processing circuit 3 every time the color sensor 1 scans each of the three primary color images, a series of three color image processing is possible by the single image processing circuit 3. Thus, there is no need to provide three image processing circuits as with conventional devices and a reduction in production costs is achieved.

Further, because the image processing circuit 3 is provided with the memory unit 4 that memorizes data for each of AGC correction, shading correction and gamma correction for each of the three primary colors, ideal correction can be sequentially performed by referring to this memory unit when the image is scanned.

Yet further, because the color sensor 1 utilizes a line sequential method that performs three-color scanning for each line, compared to the page sequential method, there is no requirement for high accuracy positioning control and there is no requirement for a page memory. This also contributes to production cost reduction.

Because the image processing circuit 3 refers to the correction data already memorized in the memory means 4 upon bank exchanging, there is no need to supply new data for correction to the memory means 4 each time the image processing circuit 3 refers to the memory means 4 for a next correction. Thus, high speed processing is realized.

What is claimed is:

1. A color image scanning device comprising:

an optical color sensor that scans an image for each of three primary colors;

a single image processing circuit that receives the scanned image from the color sensor for all three primary colors and sequentially corrects the scanned image for each of the three primary colors whenever the color sensor outputs the scanned image to the image processing circuit; and a memory means for memorizing data for each of AGC correction, shading correction and gamma correction for each of the three primary colors and performs each type of correction on the image data scanned by the sensor by referring to the memory means;

wherein the color sensor outputs the scanned image to the image processing circuit three times for a single scanning line and the image processing circuit refers to the memory means to acquire desired correction data from the memory means by bank exchanging and wherein said color image scanning device further comprises:

a timing generator controlling the color sensor to scan each of the three primary colors one-at-a-time; and a bank switching circuit controlling bank switching in the memory means thereby selecting correction data appropriate for the scanned primary color.

* * * * *